(12) United States Patent
Brune et al.

(10) Patent No.: US 6,423,775 B1
(45) Date of Patent: Jul. 23, 2002

(54) STARCH-BASED GRAFT POLYMER, PROCESS FOR ITS PREPARATION, AND USE THEREOF IN PRINTING INKS AND OVERPRINT VARNISHES

(75) Inventors: Dirk Brune, Stockelsdorf; Reinhold Von Eben-Worlée, Hamburg, both of (DE)

(73) Assignee: Worlée-Chemie GmbH, Hamburg (DE)

(*) Notice: Subject to any disclaimer, the term of this patent is extended or adjusted under 35 U.S.C. 154(b) by 0 days.

(21) Appl. No.: 09/490,054

(22) Filed: Jan. 24, 2000

(30) Foreign Application Priority Data

Jan. 25, 1999 (DE) .......................................... 199 03 979

(51) Int. Cl.⁷ ............................................. C08F 255/00
(52) U.S. Cl. ..................... 525/54.31; 527/313; 527/314
(58) Field of Search ................ 525/54.31; 527/313, 527/314

(56) References Cited

U.S. PATENT DOCUMENTS

| | | | |
|---|---|---|---|
| 2,405,973 A | 8/1946 | Nichols et al. | |
| 2,623,864 A | 12/1952 | Wrigley et al. | |
| 2,837,512 A | 6/1958 | Mantell | |
| 3,095,391 A | 6/1963 | Brockway et al. | |
| 4,029,616 A | 6/1977 | Nakashio et al. | |
| 4,060,506 A | 11/1977 | Verbanac | |
| 4,076,663 A | 2/1978 | Masuda et al. | |
| 4,079,025 A | 3/1978 | Young et al. | |
| 4,131,576 A | 12/1978 | Iovine et al. | |
| 4,301,017 A | * 11/1981 | Kightlinger et al. | 252/8.83 |
| 4,451,613 A | * 5/1984 | Rousseau et al. | 525/54.31 |
| 4,501,871 A | 2/1985 | Bartl et al. | |
| 4,576,975 A | * 3/1986 | Reilly, Jr. | 522/13 |
| 4,837,314 A | 6/1989 | Eastman | |
| 5,138,006 A | * 8/1992 | Cook et al. | |
| 5,334,287 A | 8/1994 | Hartmann et al. | |
| 5,358,998 A | 10/1994 | Wendel et al. | |
| 5,925,722 A | 7/1999 | Exner et al. | |

FOREIGN PATENT DOCUMENTS

| | | |
|---|---|---|
| DE | 2504117 | 8/1975 |
| DE | 2612846 | 10/1976 |
| DE | 2742595 | 4/1979 |
| DE | 2840010 | 6/1979 |
| DE | 3116864 | 1/1982 |
| DE | 3045487 | 7/1982 |
| DE | 3430676 | 2/1986 |
| DE | 4127733 | 2/1993 |
| EP | 000247 | 1/1979 |
| EP | 536597 | 4/1993 |
| EP | 633902 | 1/1995 |
| EP | 735065 | 10/1996 |
| GB | 2075537 | 11/1981 |
| WO | 92/13894 | 8/1992 |
| WO | 93/20119 | 10/1993 |

OTHER PUBLICATIONS

Derwent Abstract No. 1981–28176D[16] of JP–56–020054.
CAPLUS Abstract No. 1995:690063 JP–07–109691.
CAPLUS Abstract of No. 1970:68445.

* cited by examiner

Primary Examiner—Jeffrey Mullis
(74) Attorney, Agent, or Firm—Greenblum & Bernstein, P.L.C.

(57) ABSTRACT

A starch-based graft polymer, a process for its preparation and printing inks and overprint varnishes containing the graft polymer. The graft polymer is based on a derivatized starch or a derivatized starch product as the graft substrate. The starch or starch product is derivatized by one or more bifunctional monomers and grafted, at sites of derivatization, with one ore more ethylene derivatives. The process for preparing the graft polymer involves the provision of an aqueous medium containing dissolved or dispersed starch or dissolved or dispersed starch product. This dissolved or dispersed starch or dissolved or dispersed starch product is subjected to derivatization with one or more bifunctional monomers to prepare a derivatized starch or a derivatized starch product. The derivatized starch or derivatized starch product then is graft-polymerized, at sites of derivatization, with one ore more ethylene derivatives. The graft polymer is particularly suitable for use as a binder in printing inks and overprint varnishes, for example, in the form of an aqueous dispersion.

38 Claims, No Drawings

STARCH-BASED GRAFT POLYMER, PROCESS FOR ITS PREPARATION, AND USE THEREOF IN PRINTING INKS AND OVERPRINT VARNISHES

CROSS-REFERENCE TO RELATED APPLICATIONS

The present application claims priority under 35 U.S.C. §119 of German Patent Application No. 199 03 979.8, filed on Jan. 25, 1999, the disclosure of which is expressly incorporated by reference herein in its entirety.

BACKGROUND OF THE INVENTION

1. Field of the Invention

The invention relates to a starch-based graft polymer, a process for its preparation, and the use thereof in printing inks and overprint varnishes.

2. Discussion of Background Information

Currently used binders for printing inks and overprint varnishes are usually based on polymer dispersions having a solids content of 40–50% by weight of styrene and its derivatives, which are used as copolymers with acrylic acid. This requires neutralization with high concentrations of ammonia or amines, resulting in undesirably high amounts of volatile components in the product. Synthetic starting materials are used for the preparation.

On the other hand, many starch-based products are known in the prior art. Natural or modified starch has many uses in the food, paper, textile, adhesive and other industries. Starch can be modified by physical and chemical action as well as by introducing foreign groups and by grafting reactions.

SUMMARY OF THE INVENTION

The invention provides an improved graft polymer by partial or complete employment of renewable raw materials or modifications thereof, which improved graft polymer is suitable for preparing polymer dispersions that have a negligible content of volatile components and can be used advantageously as binders in printing inks or overprint varnishes. At the same time, the property profile of the currently used binders is changed as little as possible. In particular, properties such as gloss, storage stability, compatibility, water resistance and processibility are at a comparable level.

The present invention relates to a graft polymer based on derivatized starch or derivatized starch product as the graft substrate. The starch or starch product is derivatized by one or more bifunctional monomers and is grafted, at sites of derivatization, with one ore more ethylene derivatives.

The present invention also relates to a process for preparing the graft polymers according to the present invention. The process includes providing an aqueous medium containing dissolved or dispersed starch or dissolved or dispersed starch product. This dissolved or dispersed starch or dissolved or dispersed starch product is subjected to derivatization with one or more bifunctional monomers to prepare a derivatized starch or a derivatized starch product. The derivatized starch or derivatized starch product then is graft-polymerized, at sites of derivatization, with one ore more ethylene derivatives.

The resulting graft polymer can be incorporated, for example, as a polymer dispersion, in a printing ink or an overprint varnish. Consequently, the present invention also relates to printing inks and overprint varnishes which include the graft polymer.

Finally, the present invention also relates to an aqueous dispersion containing the graft polymer. A corresponding aqueous dispersion is obtainable, for example, by the process of the present invention.

DETAILED DESCRIPTION OF THE INVENTION

The process for preparing such a polymer dispersion proceeds in multiple steps. The first step (i) comprises providing (preparing) a solution or dispersion of starch or starch product and water.

Starch or starch products within the meaning of this invention are natural starches from various sources as further described below as well as modified starches such as partially degraded starches, intermediate starch products and the like. Therefore, in the following, the recited terms are used synonymously, that is, the following examples, although primarily relating to starch, also apply correspondingly to the starch products employed in the present invention.

The water-soluble or water-dispersible starch can be obtained from grains, such as corn, wheat, millet or rice as well as from tubers and roots, such as potatoes and tapioca, fruit, or legumes and other natural products. Starch products, such as dextrins or modified dextrins, can also be used advantageously. In particular, hydrolyzed starches may be used. For example, the so-called desiccated dextrins, such as yellow potato dextrin of high or average viscosity, octenyl-succinate-waxy-maize starch and/or oxidized waxy-maize starch may be used. Combinations of the aforesaid starches may also be used.

Preferred for use are one or more of the most water-soluble starches that are available, for example, in hydrolyzed form. Dissolution takes place generally in a suitable reactor provided with a heat source, a stirrer, a cooling device and a thermometer. Dissolution is accelerated by heating to about 85–95° C. The dissolution step generally lasts about 1 to 2 hours. The degree of dissolution is monitored visually on samples withdrawn from the reactor at suitable time intervals. Sixty-micron coatings are made from these samples with a doctor blade and a glass plate. Monitoring is limited to the size and content of specks in the dried film. Dissolution or dispersion is considered complete only when the 60-micron film is almost speck-free and free of gel particles.

The second process step (ii) comprises making a derivative of the dissolved or dispersed starch with bifunctional monomers. The bifunctional monomers used for this purpose contain a vinyl group and a functional group that can be condensed with the free hydroxyl groups in the starch.

The bifunctional monomers N-methylolacrylamide, N-methylolmethacrylamide, hydroxyethyl methacrylate, hydroxypropyl methacrylate or mixtures thereof are preferred for use in the condensation reaction.

It is important to use specific catalyst systems and temperature ranges for successful condensation and later polymerization.

Examples of useful catalysts include aluminum chloride, aluminum zirconium acetate, ammonium chloride, ammonium phosphate, magnesium chloride, organic acids, such as lactic acid, citric acid, para-toluenesulfonic acid, sodium chlorate or sodium perchlorate, in combination with magnesium or zinc salts, zinc nitrate, or zinc perchlorate.

The second process step is conducted generally at a temperature of about 80 to about 100° C., preferably about 90 to about 100° C. and in particular, at about 90° C. Reaction time is generally about 1 to 5, preferably about 2 to 4 and in particular, about 3 hours. For example, the condensation can be conducted at about 90°0 C. and for a period of about 3 hours. However, varying reaction times may be required, depending on the production equipment and the reactor type and size. Adapting reaction times appropriately is a matter for the skilled artisan's judgment.

The condensation reaction in the aqueous phase generally does not proceed to completion. For example, the reaction may be conducted to about 20% conversion of the bifunctional monomers. The remaining unreacted monomer will then be incorporated in the graft polymer during the subsequent radical polymerization and thus also contribute to the stability and the most favorable properties of the polymers.

The result of this process step can be followed analytically. The analysis may relate, for example, to the product of the condensation reaction involving the dissolved starch and N-methylolacrylamide. For this purpose, the condensate, for example, is precipitated with an about 7-fold quantity of ethanol and washed several times with a 50% ethanol solution. Then nitrogen is analyzed by the Kjeldahl method (according to DIN EN ISO 3188). After evaluation of the samples and blanks, the Kjeldahl nitrogen analysis generally shows that the condensation has proceeded to an extent of about 20%.

After the condensation reaction, the radical reaction with the ethylene derivative(s) can proceed as the third step (iii).

The resulting graft polymer is graft-polymerized with ethylene derivatives essentially through the starch sites derivatized by the bifunctional monomers. Therefore, the present invention also relates to graft polymers in which a small proportion of the graft polymerization has taken place on starch sites that have not become derivatized by the bifunctional monomers employed according to the present invention.

The following monomers are examples of monomers which may be used, alone or as mixtures, as ethylene derivatives: acrylic and methacrylic compounds, such as acrylic acid, methacrylic acid, acrylamide, methacrylamide, acrylonitrile, methacrylonitrile, N-methylolacrylamide, N-methylolmethacrylamide, methyl acrylate, methyl methacrylate, ethyl acrylate, ethyl methacrylate, propyl acrylate, isopropyl methacrylate, isobutyl acrylate, n-butyl acrylate, amyl acrylate, n-hexylmethacrylate, cyclohexyl methacrylate, 2-ethylhexyl methacrylate, 2-ethylhexyl acrylate, cyclohexyl acrylate, heptyl acrylate, dodecyl acrylate, octadecyl acrylate, octyl acrylate, n-butyl methacrylate, isobutyl methacrylate, decyl methacrylate, dodecyl methacrylate, octadecyl methacrylate, allyl acrylate, allyl methacrylate, 2-dimethylaminoethyl acrylate, 2-t-butylaminoethyl methacrylate, 2,3-epoxypropyl methacrylate, 2-hydroxyethyl methacrylate, 2-hydroxypropyl methacrylate, ethyleneglycol dimethacrylate, 2-hydroxyethyl acrylate, 2-hydroxypropyl acrylate, 2-ethyl-2-(hydroxymethyl)-propanediol-(1,3) trimethacrylate (trimethylolpropane triacrylate), glycidyl methacrylate, 2-ethoxyethyl methacrylate, 2-butoxymethyl methacrylate, furfuryl methacrylate, 2-trimethylammoniumethylenemethacrylate chloride, stearyl methacrylate, 2-methoxyethyl acrylate, 2-butoxyethyl acrylate, butanediol monoacrylate, butanediol diacrylate, hexanediol diacrylate, diethylaminoethyl acrylate, dimethylaminoneopentyl acrylate, ethyldiglycol acrylate, beta-phenoxyethyl acrylate, lauryl acrylate, pentaerythritol triacrylate, pentaerythritol tetraacrylate, dihydrodicyclopentadienyl acrylate, vinyl acrylate, triethyleneglycol diacrylate, tetraethyleneglycol diacrylate, tripropyleneglycol diacrylate, 3-methylpentanediol acrylate, ethyleneglycol dimethacrylate, butanediol dimethacrylate, neopentylglycol dimethacrylate, triethyleneglycol dimethacrylate, dibromopropyl acrylate, dimethylaminoethyl methacrylate; vinyl compounds, such as vinyl acetate, vinyl propionate, allyl acetate, diallyl succinate, divinyl adipate and vinyl ethyl-hexanoate, the vinyl ester of Versatic acid, N-vinyl-2-pyrrolidone, allyl alcohol, vinylsulfonic acid, maleic anhydride, maleic acid, fumaric acid, itaconic acid, sodium p-styrene sulfonate, dibutyl maleate, dibutyl fumarate, crotonic acid and hydrocarbons, such as ethylene, butadiene, styrene and alpha-methylstyrene.

Preferred ethylene derivatives include vinyl acetate, methyl acrylate, methyl methacrylate, ethyl methacrylate, hydroxyethyl methacrylate, hydroxymethyl methacrylate, glycidyl methacrylate, acrylonitrile, methacrylonitrile, acrylamide, butadiene, styrene and maleic anhydride and mixtures thereof.

The graft polymerization with the ethylene derivatives is conducted preferably by a metering method. The metering time is generally between about 20 to about 180 minutes, preferably about 30 to about 150 minutes and in particular, about 30 to about 90 minutes. However, varying reaction times may be required, depending on the production equipment and the reactor type and size. Adapting reaction times appropriately is a matter for the skilled artisan's judgment.

The reaction temperature should be in the range of about 60 to about 90° C., preferably about 60 to about 80° C. and in particular, about 70 to about 80° C.

Examples of suitable catalysts include radical-forming initiators and redox systems. Exemplary radical-forming polymerization initiators that may be used include alkali and ammonium salts of peroxy acids, such as potassium, sodium and ammonium persulfate. Other polymerization initiators that may be used include hydrogen peroxide, perborates and azo compounds, such as azodiisobutyronitrile. Organic peroxides and hydroperoxides, such as benzoyl peroxide, t-butyl hydroperoxide, diisopropylbenzene hydroperoxide and t-butyl perbenzoate may also be used. Additionally, redox systems use activators, such as sodium hydrogen sulfite, sodium bisulfite, sodium formaldehyde sulfoxylate, ascorbic acid, n-dodecylmercaptan and n-butyl-3-mercaptopropionate, in combination with one or more initiators.

To attain the desired property profile, the starting materials are used preferably in specific ratios. Preferred ratios are in the range of about 20 to about 60% by weight, in particular, about 30 to about 50% by weight starch, about 1 to about 10% by weight, in particular, about 3 to about 7% by weight (for example, about 3 to about 5% by weight) bifunctional monomer, and about 30 to 79% by weight, in particular, about 43 to about 67% by weight ethylene derivative, in each case based on the solids content of the dispersion obtained. Too low a proportion of starch may result in polymer dispersions having a high content of agglomerate and very turbid polymer films having very low gloss. If the starch concentration becomes too high, gloss increases but the films become too hydrophilic, or the viscosity of the polymer dispersion increases, so that processing is no longer possible. Derivatization is necessary particularly in order to enable a subsequent grafting step. An adequate concentration of ethylene derivative results in properties, such as hydrophobicity and gloss, that are necessary for practical use.

After the termination of the reaction, the product is generally cooled to room temperature and adjusted to pH 8.5±0.5 with technical, i.e., about 26% aqueous ammonia; less than about 1% by weight, relative to the polymer dispersion, of ammonia solution, is usually required. Additional conventional additives can be added to the binder, such as preservatives, neutralizers, defoamers, wetting agents and the like. Thus, for example, the polymer dispersion according to the present invention may be protected against microbial infestation by the addition of a commercial preservative based on isothiazolinone.

The solids content of the dispersions according to the present invention usually ranges from about 30 to about 70% by weight, preferably about 30 to about 60% by weight and in particular, about 40% by weight. The viscosity thereof usually is in the range of about 200 to about 1000 mPas, in particular, about 500 to about 600 mPas. The particle size of the graft polymer usually ranges from about 0.1 to about 0.6 microns, preferably about 0.2 to about 0.5 microns and in particular, about 0.28 to about 0.42 microns.

A clear advantage of the process according to the present invention is that it can be conducted without the addition of surfactants or emulsifiers.

Another advantage of the process according to the present invention is that steps (i) to (iii) can be conducted in immediate succession in the aqueous phase, preferably in a reaction device, without intermediate steps, such as separation, being required.

The resulting graft polymer can be incorporated, for example in the form of an aqueous polymer dispersion obtained as described above and by conventional techniques known to the skilled person, into printing inks, such as flexographic printing inks, or overprint varnishes.

The polymer dispersions according to the present invention are generally also outstanding for high viscosity stability, i.e., despite a high solids content, their viscosity does not change during an extended time period. The usual retrogradation in starch-containing products, which results in a viscosity increase or phase separation by creaming or sedimentation, is eliminated in these polymer dispersions by suitable selection of the starch products. The polymer dispersions according to the present invention are generally finely dispersed, and yield high gloss, speck-free coatings. They can be easily converted into films at room temperature with the usual film-forming auxiliary agents. As described above, neutralization with ammonia or amines is required to only a very slight extent, so that the proportion of volatile components is not to be considered critical. In general, the proportion of volatile components, excluding water, is below about 1% by weight, for example, about 0.1 to about 0.9% by weight, preferably below about 0.5% by weight.

EXAMPLE 1

Preparation of the Graft Polymer

Dried corn dextrin (366 g) was dissolved in 1040 g of deionized water at a temperature of 85 to 95° C. under a nitrogen atmosphere in a two-liter, 4-neck flask fitted with a stirrer, thermometer, reflux condenser and monomer inlet. The dissolution took 60 minutes. Then 38 g of N-methylolacrylamide, as the monomer, were added at 90° C. as a 48% by weight solution in water. A 6% by weight solution of aluminum chloride and water was used as the catalyst; 66 g of this solution were added into the reactor. The reaction time was about 3 hours. The reactor was then cooled to 65° C. Styrene (331 g) was added and emulsified for 20 minutes. The catalyst system of 4 g of t-butyl hydroperoxide and a mixture of 0.8 g of ascorbic acid and 1.5 g of sodium bisulfite in 8 g of deionized water was freshly prepared and added. After the resulting exothermic reaction, 130 g of styrene were added by a metering process. The metering rate was 4.5 g/min. In parallel with the monomer metering, 4 g of t-butyl hydroperoxide and a mixture of 1.2 g ascorbic acid and 2.2 g of sodium bisulfite dissolved in 20 g of water were injected. The reaction temperature was not allowed to exceed 80° C. during the subsequent grafting reaction.

After the termination of the metering step, 0.5 g of ascorbic acid in 4 g of water and 0.5 g of t-butyl hydroperoxide were each added. The temperature was held at 80° C. for one hour. Thereafter the remaining monomer content was <0.1% by weight. The polymer dispersion was cooled to 20° C. and neutralized with ammonia.

Kjeldahl analysis of the reaction product of the condensation step showed 20.6% conversion. The solids content of the polymer dispersion was 40±1% by weight. The pH was 8.5 and the viscosity was 550 mPas. The gloss was 90%. The lowest film-forming temperature was about 75 to 80° C. The pendulum hardness of the dried film was about 200 seconds. The result of the particle size measurement was 0.28 to 0.42 microns. The coating evaluation and water resistance are comparable to standard products based on synthetic starting materials.

The above examinations of the polymer dispersion were done by the following methods:

1. Evaluating the films: 6 micron coating of the polymer dispersion on a glass plate with the aid of a doctor blade and visual judgment of specks (number and size)

2. Visual evaluation of the film for turbidity.

3. Checking water resistance on dried film with a stop watch and optical evaluation of defects in the film after water contact at timed intervals.

4. Measurement of the lowest film-forming temperature according to DIN 53787.

5. Measurement of viscosity with a Brookfield rotation viscosimeter LVT at 20° C. (spindle 2, 30 rpm).

6. Measurement of pH according to DIN 53785

7. Measurement of nonvolatile components, that is, solids content according to DIN 53216, Part 1 (1 h, 125° C.).

8. Measurement of pendulum hardness according to König according to DIN 53157.

9. Measurement of gloss on a 12 micron coating of the polymer dispersion on a Chromolux board. The measurement is made according to TRIGLOSS at an angle of 60° C.

10. Measurement of particle size by photon correlation spectroscopy.

EXAMPLE 2

Preparation of an Overprint Varnish

Composition (all data in percent by weight relative to the total weight of the composition):

| | |
|---|---|
| Starch polymer dispersion (40% in water) | 55.0 |
| WorléeCryl 8025* | 25.0 |
| WorléeWax 8510** | 5.0 |
| 1,2-propyleneglycol | 2.0 |
| Defoamer*** | 0.2 |

-continued

| | |
|---|---|
| Wetting agent**** (10% in water) | 0.3 |
| Water | 12.5 |

*= acrylic resin solution, 25% in water
**= polyethylene wax dispersion, 35% in water
***= for example, commercial product Dow Corning 65 from Dow Corning Co.
****= for example, commercial product FC 129 from 3M Co.

The above components were mixed together and the viscosity was adjusted with water to about 20 s (DIN 53 211). The starch polymer dispersion was prepared as described above in Example 1. The gloss of the dried film was <80% at an angle of 60° C., and the heat sealing stability (3 bar/1 s) was 130° C. The pendulum hardness was 200 s.

EXAMPLE 3

Preparation of an Aqueous, White, Flexographic Printing Ink

Composition (all data in percent by weight relative to the total weight of the composition):

| | |
|---|---|
| WorléeCryl 8025* | 25.0 |
| Titanium dioxide | 30.0 |
| Defoamer*** | 0.3 |
| Starch polymer dispersion (40% in water) | 35.5 |
| WorléeWax 8510** | 3.0 |
| 1,2-propyleneglycol | 2.0 |
| Wetting agent**** (10% in water) | 0.2 |
| Water | 4.0 |

*= acrylic resin solution, 25% in water
**= polyethylene wax dispersion, 35% in water
***= for example, commercial product Dow Corning 65 from Dow Corning Co.
****= for example, commercial product FC 129 from 3M Co.

25% by weight of WorléeCryl 8025,30 parts by weight of titanium dioxide and 0.3 parts by weight of defoamer were mixed together vigorously in a dissolver (bead mill) for 20 minutes. The remainder of the above components was added in the given proportions, and the viscosity was adjusted with water to 20 s (DIN 53211). The starch polymer dispersion was prepared as described above in Example 1. The gloss of the dried film was <40% at an angle of 60° C., and the heat sealing stability (3 bar/1 s) was 150° C. The pendulum hardness was 200 s.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A graft polymer based on derivatized starch or derivatized starch product as the graft substrate, wherein the starch or starch product is derivatized by one or more bifunctional monomers containing (i) a vinyl group, and (ii) a functional group that can be condensed with a free hydroxyl group present in the starch or starch product, and is grafted, at sites of derivatization, with one or more ethylene derivatives, said graft polymer containing about 30% to about 50% by weight of units derived from said starch or starch product, about 3% to about 7% by weight of units derived from said one or more bifunctional monomers, and about 43% to about 67% by weight of units derived from said one or more ethylene derivatives.

2. The graft polymer according to claim 1, wherein the derivatized starch is based on starch selected from the group consisting of grain starch, tuber starch, root starch, fruit starch, legume starch and combinations thereof.

3. The graft polymer according to claim 1, wherein the derivatized starch product is based on one or more hydrolyzed starches.

4. The graft polymer according to claim 3, wherein the hydrolyzed starches are selected from the group consisting of desiccated dextrins, modified dextrins and combinations thereof.

5. The graft polymer according to claim 1, wherein the one or more bifunctional monomers are selected from the group consisting of N-methylolacrylamide, N-methylolmethacrylamide, hydroxyethyl methacrylate, hydroxypropyl methacrylate, and combinations of two or more thereof.

6. The graft polymer according to claim 1, wherein the one or more ethylene derivatives are selected from the group consisting of vinyl acetate, methyl acrylate, methyl methacrylate, ethyl methacrylate, hydroxyethyl methacrylate, hydroxymethyl methacrylate, glycidyl methacrylate, acrylonitrile, methacrylonitrile, acrylamide, butadiene, styrene, maleic anhydride, and combinations of two or more thereof.

7. The graft polymer according to claim 1, wherein the starch is selected from the group consisting of grain starch, tuber starch, root starch, fruit starch, legume starch and combinations thereof, the starch product is selected from the group consisting of desiccated dextrins, modified dextrins and combinations thereof, the one or more bifunctional monomers are selected from the group consisting of N-methylolacrylamide, N-methylolmethacrylamide, hydroxyethyl methacrylate, hydroxypropyl methacrylate, and combinations of two or more thereof, and the one or more ethylene derivatives are selected from the group consisting of vinyl acetate, methyl acrylate, methyl methacrylate, ethyl methacrylate, hydroxyethyl methacrylate, hydroxymethyl methacrylate, glycidyl methacrylate, acrylonitrile, methacrylonitrile, acrylamide, butadiene, styrene, maleic anhydride, and combinations of two or more thereof.

8. The graft polymer according to claim 1, obtained by a process comprising:
 (i) providing an aqueous medium containing dissolved or dispersed starch or dissolved or dispersed starch product;
 (ii) derivatizing the dissolved or dispersed starch or the dissolved or dispersed starch product with said one or more bifunctional monomers to prepare derivatized starch or derivatized starch product; and
 (iii) graft-polymerizing the derivatized starch or derivatized starch product, at sites of derivatization, with said one or more ethylene derivatives.

9. An aqueous dispersion containing a graft polymer based on derivatized starch or derivatized starch product as the graft substrate, wherein the starch or starch product is derivatized by one or more bifunctional monomers containing (i) a vinyl group, and (ii) a functional group that can be condensed with a free hydroxyl group present in the starch or starch product, and is grafted, at sites of derivatization, with one or more ethylene derivatives, said graft polymer containing about 30% to about 50% by weight of units derived from said starch or starch product, about 3% to about 7% by weight of units derived from said one or more bifunctional monomers, and about 43% to about 67% by weight of units derived from said one or more ethylene derivatives.

10. The aqueous dispersion according to claim 9, which contains one or more additives selected from the group consisting of preservatives, neutralizers, defoamers and wetting agents.

11. The aqueous dispersion according to claim 9, which has a solids content of about 30 to about 70% by weight.

12. The aqueous dispersion according to claim 11, which has a solids content of about 30 to about 60% by weight.

13. The aqueous dispersion according to claim 12, which has a solids content of about 40% by weight.

14. The aqueous dispersion according to claim 9, which is neutralized with a neutralizing agent and contains less than about 1% by weight of volatile components, excluding water.

15. The aqueous dispersion according to claim 14, which contains less than about 0.5% by weight of volatile components, excluding water.

16. The aqueous dispersion according to claim 9, which has a Brooldield viscosity measured at 20° C. with spindle 2 and at 30 rpm of about 200 to about 1000 mPas.

17. The aqueous dispersion according to claim 16, which has a viscosity of about 500 to about 600 mPas.

18. The aqueous dispersion according to claim 12, wherein the particle size of the graft polymer determined by photon correlation spectroscopy is about 0.1 to about 0.6 microns.

19. The aqueous dispersion according to claim 18, wherein the particle size of the graft polymer is about 0.2 to about 0.5 microns.

20. The aqueous dispersion according to claim 19, wherein the particle size of the graft polymer is about 0.28 to about 0.42 microns.

21. The aqueous dispersion of claim 9, which has a solids content of about 40% by weight and a Brookfield viscosity measured at 20° C. with spindle 2 and at 30 rpm of about 500 to about 600 mPas, is neutralized with a neutralizing agent and contains less than about 0.5% by weight of volatile components, excluding water, and wherein the particle size of the graft polymer determined by photon correlation spectroscopy is about 0.28 to about 0.42 microns.

22. A material for printing selected from the group consisting of printing inks and overprint varnishes and containing binder, wherein the binder includes a graft polymer based on derivatized starch or derivatized starch product as the graft substrate, the starch or starch product being derivatized by one or more bifunctional monomers containing (i) a vinyl group, and (ii) a functional group that can be condensed with a free hydroxyl group present in the starch or starch product, and being grafted, at sites of derivatization, with one or more ethylene derivatives, said graft polymer containing about 30% to about 50% by weight of units derived from said starch or starch product, about 3% to about 7% by weight of units derived from said one or more bifunctional monomers, and about 43% to about 67% by weight of units derived from said one or more ethylene derivatives.

23. The material for printing according to claim 22, wherein the graft polymer is employed as aqueous dispersion.

24. A process for preparing a graft polymer based on derivatized starch or derivatized starch product as the graft substitute, the starch or starch product being derivatized by one or more bifunctional monomers and grafted, at sites of derivatization, with one or more ethylene derivatives, said process comprising
(i) providing an aqueous medium containing dissolved or dispersed starch or dissolved or dispersed starch product;
(ii) derivatizing the dissolved or dispersed starch or the dissolved or dispersed starch product with one or more bifunctional monomers containing (i) a vinyl group, and (ii) a functional group that can be condensed with a free hydroxyl group present in the starch or starch product to prepare derivatized starch product; and
(iii) graft-polymerizing the derivatized starch product, at sites of derivatization, with one or more ethylene derivatives; and starch or starch product, said one or more bifunctional monomers and said one or more ethylene derivatives being employed in such relative amounts as to result in a graft polymer containing about 30% to about 50% by weight of units derived from said one or more bifunctional monomers, and about 43% to about 67% by weight of units derived from said one or more ethylene derivatives.

25. The process according to claim 24, which is conducted in an aqueous phase without added surfactants or emulsifiers.

26. The process according to claim 24, wherein steps (i) to (iii) are conducted in immediate succession in an aqueous phase.

27. The process according to claim 24, wherein one or more catalysts are used in step (ii), the catalysts being selected from the group consisting of aluminum chloride, aluminum zirconium acetate, ammonium chloride, ammonium phosphate, magnesium chloride, organic acids, sodium chlorate or sodium perchlorate combined with magnesium or zinc salts, zinc nitrate, zinc perchlorate and combinations thereof.

28. The process according to claim 24, wherein step (ii) is conducted at a temperature of about 80 to about 100° C.

29. The process according to claim 24, wherein the reaction time for process step (ii) is about 1 to about 5 hours.

30. The process according to claim 24, wherein the derivatization reaction of step (ii) is allowed to proceed to only about 20% conversion of the one or more bifunctional monomers, unreacted monomer being allowed to participate as comonomer in the graft polymerization of step (iii).

31. The process according to claim 24, wherein in step (iii) one or more catalysts are used, said catalysts being selected from the group consisting of radical-forming initiators, redox systems and combinations thereof.

32. The process according to claim 31, wherein the one or more catalysts are selected from the group consisting of alkali and ammonium salts of peroxy acids, hydrogen peroxide, perborates, azo compounds, organic peroxides and hydroperoxides, sodium hydrogen sulfite, sodium bisulfite, sodium formaldehyde sulfoxylate, ascorbic acid, n-dodecylmercaptan, n-butyl-3-mercapto-propionate, and combinations thereof.

33. The process according to claim 31, wherein the one or more catalysts include t-butyl hydroperoxide, ascorbic acid and sodium bisulfite.

34. The process according to claim 24, wherein step (iii) is conducted as a metering process.

35. The process according to claim 34, wherein the metering time is about 20 to about 180 minutes.

36. The process according to claim 24, wherein the reaction temperature during step (iii) ranges from about 60 to about 90° C.

37. The process according to claim 24, which includes an additional neutralization subsequent to step (iii), the neutralization being carried out to a pH of 8.5±0.5.

38. The process according to claim 24, wherein step (ii) is conducted at a temperature of about 80 to about 100° C. and one or more catalysts are used in step (ii), the catalysts being selected from the group consisting of aluminum chloride, aluminum zirconium acetate, ammonium chloride, ammonium phosphate, magnesium chloride, organic acids, sodium chlorate or sodium perchlorate combined with magnesium or zinc salts, zinc nitrate, zinc perchlorate and combinations thereof, wherein the derivatization reaction of step (ii) is allowed to proceed to only about 20% conversion of the one or more bifunctional monomers, unreacted monomer being allowed to participate as comonomer in the graft polymerization of step (iii), and wherein the reaction temperature during step (iii) ranges from about 60 to about 90° C. and one or more catalysts are used in step (iii), said catalysts being selected from the group consisting of radical-forming initiators, redox systems and combinations thereof.

* * * * *